United States Patent Office

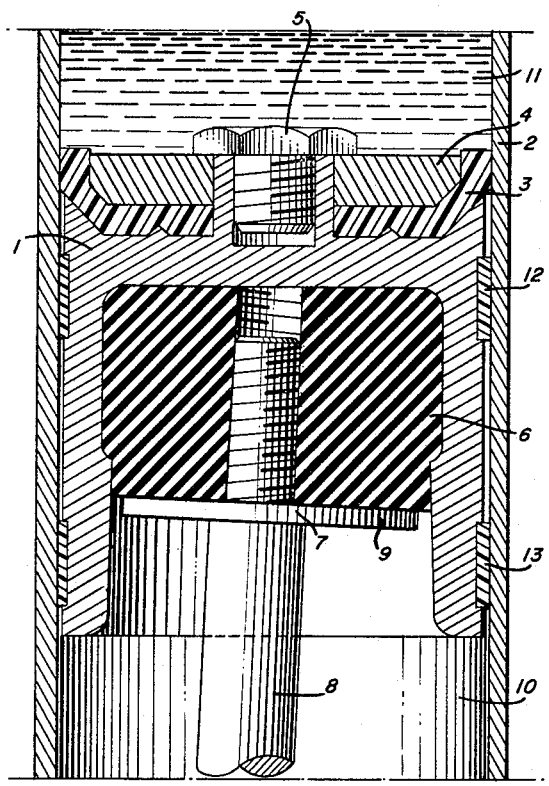

3,168,301
Patented Feb. 2, 1965

3,168,301
PISTONS AND IN PARTICULAR PISTONS USED IN OLEO-PNEUMATIC SUSPENSION SYSTEMS
Fernand Stanislas Allinquant, 53 Ave. Le Notre, Parc de Sceaux, France
Filed Dec. 9, 1960, Ser. No. 75,022
Claims priority, application France, Dec. 16, 1959, 813,193
1 Claim. (Cl. 267—64)

This invention relates to pistons, in particular pistons used in oleo-pneumatic suspension systems, provided with means usually consisting of a non-metallic resilient seal of the cup type to ensure fluid tightness between the piston and its associated cylinder.

In an oleo-pnuematic suspension unit for automobiles, the piston-rod is connected to an arm carrying one of the wheels of the vehicle, the cylinder being attached to the automobile chassis. In general, the cylinder volume beneath the piston is occupied by air at atmospheric pressure while the volume above the piston is occupied by a fluid subjected to a relatively high pressure.

This pressure differential between the two volumes requires the provision of a very small clearance between the periphery of the piston and the cylinder bore in order to prevent the sealing washer from being thrust by such high pressure into the space between the piston and the cylinder.

Moreover it is necessary to avoid any form of metal-to-metal friction between the piston and the cylinder, otherwise the metal dust produced would ultimately score the sealing washer, thereby leading to leaks between the upper and lower volumes of the cylinder and consequently to faulty operation of the suspension unit.

Furthermore, the very small clearance necessitated between the piston periphery and the cylinder bore prohibits the use of conventional piston-rings, since these have a high coefficient of expansion which is incompatible with the small clearance permissible.

In accordance with the invention, there is provided, on the periphery of the piston, a plastic spacing ring having a low coefficient of friction and preferably made of the polytetrafluoroethylene substance known by the trade name Teflon, designed solely to avoid metal-to-metal contact between the piston and cylinder, the necessary sealing action between the volumes on either side of the piston being independently ensured by a suitable seal of the cup type.

This plastic ring may either be interrupted by a diagonal cut after the fashion of conventional piston-rings or be uninterrupted over the whole of its circumference. In the latter case, it is forced onto the piston using a chuck, say, for the purpose and taking advantage of the elasticity of the plastic material from which said ring is constituted.

The description which follows with reference to the accompanying drawing given by way of example only and not in a limiting sense will give a clear understanding of how the invention may be performed, such particularities as emerge from the description or the drawing naturally forming part thereof.

The drawing is a sectional view of part of a cylinder within which slides a piston according to this invention.

The piston 1 shown in the drawing slides in a cylinder 2 and carries on its upper face a sealing cup 3 whose relaxed diameter is greater than that of the cylinder bore so as to form a lipped seal against the cylinder bore.

This sealing cup is tightened onto the piston by a metal washer 4 retained by the head of a screw 5 threaded into a tapped hole drilled into the upper face of the piston.

The top part of the piston's interior is occupied by a thick rubber pad 6 into which is pierced a hole which cooperates with the reduced and threaded end 7 of a connecting-rod 8 thrusting against the lower face of pad 6 through the medium of a metal washer 9.

In the case of an oleo-pneumatic automobile suspension unit, the free end of connecting-rod 8 is articulated onto an arm carrying one of the wheels of the vehicle while cylinder 2 is attached to the chassis of said vehicle.

The volume 10 located beneath the piston and limited by the cylinder contains only air at atmospheric pressure while the volume 11 located above the piston is filled with a fluid subjected to relatively high pressure of the order of 425 lb. per sq. in., for example.

As hereinbefore stated, it is necessary for the clearance between the piston periphery and the cylinder bore to be small; otherwise, under the effect of the pressure prevailing in volume 11, the edge of sealing cup 3 would be forced into the annular space between the piston and the cylinder, which would lead to very rapid deterioration of said cup and to leakage between volumes 11 and 10.

To avoid all metal-to-metal friction between the piston and the cylinder, grooves are embodied in the piston periphery into which are fitted plastic spacing rings 12 and 13 having a low coefficient of friction.

To this end use can be made of spacing rings made of fluorinated plastic material, say of polytetrafluoroethylene which is commercially available under the brand name Teflon and which possesses very good mechanical characteristics and an extremely low coefficient of friction in particular.

Rings 12 and 13 can be interrupted by an oblique cut as in ordinary piston-rings, or be uninterrupted over their whole circumference. In the latter case, they are force-fitted onto the piston by means of a chuck, taking advantage of the elasticity possessed by the plastic material.

The use herein of the term "non-metallic" with reference to the sealing ring 3 is intended to refer to a sealing ring which, at its area of sliding engagement with the cylinder 2, is of material which in its composition is so predominantly "non-metallic" that it substantially avoids and prevents metal-to-metal engagement between the piston and the cylinder.

It is to be clearly understood that the invention is by no means limited to the use of two spacing rings specifically, the number ultimately used being determined by experience in each case.

What I claim is:

In an oleo-pneumatic vehicle suspension unit wherein a metal piston is slidable in a metallic cylinder with radial metal-to-metal clearance and at one face defines within said cylinder a chamber filled with oil under a substantial excess pressure, said piston at the other face thereof being connected to a rockable connecting-rod; a guide and seal packing for said unit, comprising, in combination, a flexible rubber seal of the cup type carried by said piston at said one face thereof and having a self-sealing lip directed toward the pressurized oil and against an adjacent inner surface of said cylinder, means for fluid tightly securing said cup seal to said piston, said piston being provided with at least one annular groove in its periphery, and at least one solid spacing ring of polytetrafluoroethylene arranged in said annular groove and projecting radially beyond the periphery of said piston, said spacing ring constituting the sole spacer means between said piston and said cylinder and preventing any metal-to-metal friction.

References Cited by the Examiner
UNITED STATES PATENTS

| | | | |
|---|---|---|---|
| 1,805,957 | 5/31 | Stephens | 309—5 |
| 2,644,699 | 7/53 | Weiertz | 267—15 |
| 2,712,483 | 7/55 | Ciaccia | 309—4 |
| 2,727,797 | 12/55 | Snyder | 92—240 |
| 2,807,511 | 9/57 | Fleming | 309—23 |
| 2,836,474 | 5/58 | Mosher | 309—4 |
| 2,887,342 | 5/59 | Helsel | 309—4 |
| 2,963,217 | 12/60 | Wysong | 309—23 |
| 2,991,003 | 7/61 | Petersen | 309—4 |
| 3,030,753 | 4/62 | Pennington | 309—4 |
| 3,039,834 | 6/62 | Howe | 309—14 |

RICHARD B. WILKINSON, *Primary Examiner.*

RALPH H. BRAUNER, ANDRES H. NIELSON, FRED E. ENGELTHALER, SAMUEL LEVINE, *Examiners.*